(12) United States Patent
Feser et al.

(10) Patent No.: US 6,970,778 B1
(45) Date of Patent: Nov. 29, 2005

(54) PASSENGER RESTRAINT SYSTEM FOR A MOTOR VEHICLE

(75) Inventors: Michael Feser, Barbing (DE); Oskar Leirich, Mintraching (DE); Jochen Uhde, Regensburg (DE)

(73) Assignee: Siemens Aktiengesellschaft, München (DE)

( * ) Notice: Subject to any disclaimer, the term of this patent is extended or adjusted under 35 U.S.C. 154(b) by 286 days.

(21) Appl. No.: 10/332,333

(22) PCT Filed: Jul. 7, 2000

(86) PCT No.: PCT/DE00/02222

§ 371 (c)(1),
(2), (4) Date: Jan. 7, 2003

(87) PCT Pub. No.: WO02/04257

PCT Pub. Date: Jan. 17, 2002

(51) Int. Cl.[7] .............................................. B60R 21/32
(52) U.S. Cl. .................... 701/45; 340/436; 180/271; 280/735
(58) Field of Search ........................... 701/45, 47, 46, 701/49; 280/735, 734; 180/232, 282, 271, 180/274; 340/436, 467, 438; 307/10.1

(56) References Cited

U.S. PATENT DOCUMENTS

| 4,958,851 | A | | 9/1990 | Behr et al. |
|---|---|---|---|---|
| 5,037,129 | A | * | 8/1991 | Fritz et al. .................... 280/734 |
| 5,173,614 | A | | 12/1992 | Woehrl et al. |
| 5,285,188 | A | * | 2/1994 | Yoshida ...................... 340/436 |
| 5,515,276 | A | * | 5/1996 | Kura et al. .................... 701/45 |
| 5,629,847 | A | | 5/1997 | Shirakawa et al. .... 364/424.055 |
| 5,631,834 | A | * | 5/1997 | Tsurushima et al. ........... 701/45 |
| 5,961,562 | A | | 10/1999 | Iyoda .......................... 701/45 |
| 6,115,659 | A | * | 9/2000 | Buchheim et al. ............. 701/45 |
| 6,256,562 | B1 | * | 7/2001 | Frimberger et al. ........... 701/45 |
| 6,274,948 | B1 | | 8/2001 | Blank et al. |
| 6,426,567 | B2 | * | 7/2002 | Ugusa et al. ............... 307/10.1 |
| 2002/0173882 | A1 | * | 11/2002 | Tobaru et al. .................. 701/1 |

FOREIGN PATENT DOCUMENTS

| DE | 38 16 587 A1 | 11/1989 | |
| DE | 198 27 557 A1 | 12/1999 | ........... B60R 21/32 |
| EP | 0 987 151 A1 | 4/1999 | ........... B60R 21/32 |
| WO | WO 99/12773 | 3/1999 | |

* cited by examiner

*Primary Examiner*—Thomas G. Black
*Assistant Examiner*—Tuan C To
(74) *Attorney, Agent, or Firm*—Cohen, Pontani, Lieberman & Pavane

(57) ABSTRACT

The invention relates to a passenger restraint system that contains two electronic acceleration sensors that are arranged separately from each other and that are coupled with a control device that triggers the restraint system in the event of a collision of the vehicle. The inventive system is further characterized in that the restraint system is only triggered if the sum of the integrated acceleration signals weighted with a weighting coefficient exceeds a defined minimum sum.

11 Claims, 2 Drawing Sheets

PASSENGER RESTRAINT SYSTEM FOR A MOTOR VEHICLE

PRIORITY CLAIM

This is a U.S. national stage of application No. PCT/DE00/02222, filed on 7 Jul. 2000. Priority is claimed on that application.

BACKGROUND OF THE INVENTION

1. Field of the Invention

The invention relates to an occupant restraint system for a motor vehicle.

2. Description of the Prior Art

Modern occupant restraint systems, such as for example belt pretensioners or driver or passenger airbags, are intended to be triggered only in the event of, for example, a frontal or angled collision. On the other hand, triggering should not take place in the event of bumpy roads, electromagnetic incompatibility or as the result of a fault within the electronic circuit. On account of the latest generation of so-called smart airbags and the ever more frequent use of electronic front sensors on the vehicle, increasingly shorter triggering times are also being obtained for passive restraining means.

Malfunctions of the occupant restraint system are currently prevented by a mechanical acceleration sensor, known as the safing sensor. Mechanical safing sensors (for example ball in tube, Rollamite, etc.) are based on a different physical principle than electronic acceleration sensors. In this case, electrical disturbances can influence the electronic sensors much more severely than is the case with mechanical sensors. For example, the triggering of an airbag only takes place when the electronic sensor initiates triggering and, moreover, the mechanical sensor (mechanical switch function) is closed. However, instances of erroneous airbag triggering caused by unfavorable road conditions cannot be prevented in every case by means of a mechanical sensor, since the vibrations may cause the mechanical sensors to be closed.

The use of electronic acceleration sensors, in particular in the crash zone of the vehicle (for example front or early crash sensors) allow ever shorter triggering times for occupant restraint systems. On the other hand, even today the available mechanical sensors sometimes no longer achieve the closing time required for this. A further increase in the sensitivity of the overall occupant restraint system by lowering the response threshold of the mechanical sensors does not appear to be advisable on account of the associated increasing frequency of closing under normal driving conditions.

SUMMARY OF THE INVENTION

It is therefore the object of the invention to provide an occupant restraint system for a motor vehicle in which better protection against instances of erroneous triggering is achieved in spite of a very low triggering time.

The object is achieved by an occupant restraint system according to patent claim 1. Refinements and developments of the idea of the invention are the subject of subclaims.

An advantage of the invention is that redundant information that is predominantly already available in the vehicle is used to reliably detect a collision and distinguish it from malfunctions, with the result that the additional expenditure for the replacement of the mechanical sensor is extremely low and, apart from a few additional hardware components, it can be predominantly realized by software.

This is achieved specifically by an occupant restraint system with a restraining means for protecting occupants in the motor vehicle and with at least two electronic acceleration sensors that are arranged separately from each other for detecting a collision (for example a front sensor and a sensor arranged centrally in the control device). Coupled to the acceleration sensors via an evaluation unit is a control device for triggering the restraining means in the event of a collision of the vehicle. The evaluation unit integrates the acceleration signals provided by the acceleration sensors, it being possible for the evaluation unit to be separate or else integrated into the acceleration sensors or preferably into the control device. Triggering only takes place when the sum of the integrated acceleration signals respectively weighted with a weighting coefficient exceeds a defined minimum sum.

The integration of the acceleration signals is started when the signal exceeds a defined threshold value (minimum acceleration). In each computing cycle, a constant value is subtracted from the calculated integral simultaneously at one or more acceleration sensors. If the acceleration drops below this constant value, the amount of the integral decreases with each computing cycle. If the integral reaches the absolute value, no further integration is carried out.

Furthermore, an acceleration sensor is preferably integrated into the control device and/or an acceleration sensor is remotely located. The remotely located acceleration sensor is in this case preferably arranged in the front region of the vehicle. In this case it is possible to provide the remotely located acceleration sensor with preprocessing device (under some circumstances a controller), which carries out a preprocessing of the signal. The signal preprocessing may comprise, for example, a filtering and discretizing of the acceleration signal.

A plausibility check is preferably also carried out in the control unit. In the plausibility check there is carried out, for example, an evaluation of the acceleration signals to ascertain that acceleration signals with extreme signal jumps or unusual signal waveforms are eliminated.

Apart from realizing the safing function by electronic means, the customary methods of collision detection are preferably also additionally used, i.e. a direct evaluation of the individual acceleration signals is performed.

BRIEF DESCRIPTION OF THE DRAWINGS

The invention is explained in more detail below on the basis of the exemplary embodiment represented in the figures of the drawing, in which.

DETAILED DESCRIPTION OF THE PRESENTLY PREFERRED EMBODIMENTS

Figure 1:
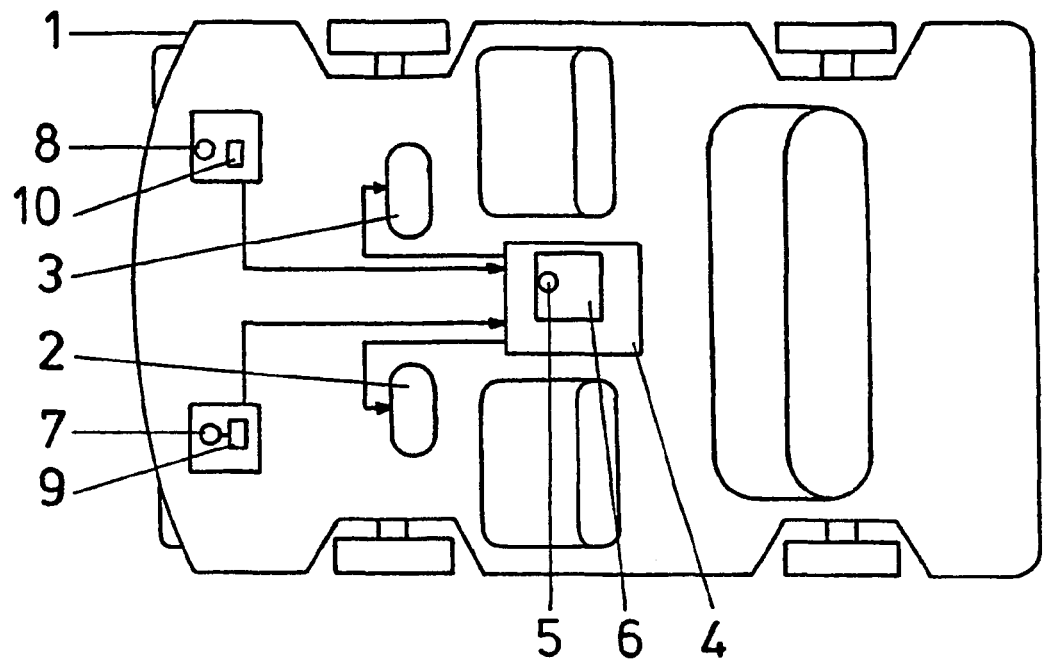
FIG. 1 is a schematic view of a general embodiment of an occupant restraint system according to the invention.

According to the exemplary embodiment shown in FIG. 1, a vehicle 1 is equipped with a driver airbag 2 and a passenger airbag 3. For the sake of better overall clarity, only the chassis of the vehicle 1 is represented in the drawing. At a central location, that is to say substantially in the middle of the vehicle 1, there is a central control device (ECU) 4, which is connected to the driver airbag 2 and passenger airbag 3 to control them. The control device 4 includes an electronic acceleration sensor 5, downstream of which there is a microcontroller 6 for performing signal preprocessing and plausibility checking. The control device additionally includes circuit parts which are not represented for signal preprocessing and for generating the triggering signals for the driver airbag 2 and the passenger airbag 3.

Also connected to the control device 4 are two further, remotely located electronic acceleration sensors 7 and 8, with in each case a downstream preprocessing device 9 and 10, respectively, for filtering and for analog-digital conversion.

The acceleration sensors 7 and 8 are in this case arranged in the front region of the vehicle toward the two front corners of the vehicle. In the case of the exemplary embodiment, the two acceleration sensors 7 and 8 are connected directly to the control device 4. The evaluation of the three acceleration signals from the remotely located acceleration sensors 7, 8 and the central acceleration sensor 5 takes place in this case by the microcontroller 6 of the control device 4. It also carries out a plausibility check in such a way that, for example, it eliminates acceleration signals with extreme signal jumps or unusual signal waveforms.

Apart from the integration, the control device (microcontroller) also carries out in particular a weighting of the integrated acceleration signals, the subsequent summation and the comparison with a predetermined minimum sum. A collision accordingly exists if, for example in the case of three acceleration sensors, the following relationship applies:

$$S = K_1 \int B_1 + K_2 \int B_2 + K_3 \int B_3 > MS$$

In this case, S stands for the sum, MS for the minimum sum, $B_1$, $B_2$ and $B_3$ for acceleration signals of the acceleration sensors 5, 7, 8 and $K_1$, $K_2$ and $K_3$ for the associated weighting coefficients. The weighting coefficients in this case depend in particular on the vehicle superstructure (for example rigidity of the body) and the position of the individual acceleration sensors. If a smaller or greater number of acceleration sensors are used, the relationship must be adapted correspondingly.

Apart from realizing the safing function, the customary methods of collision detection are also used in the control device, i.e. a direct evaluation of individual acceleration signals is performed. In this method, a collision exists if each individual acceleration signal exceeds a respective threshold.

Figure 2:
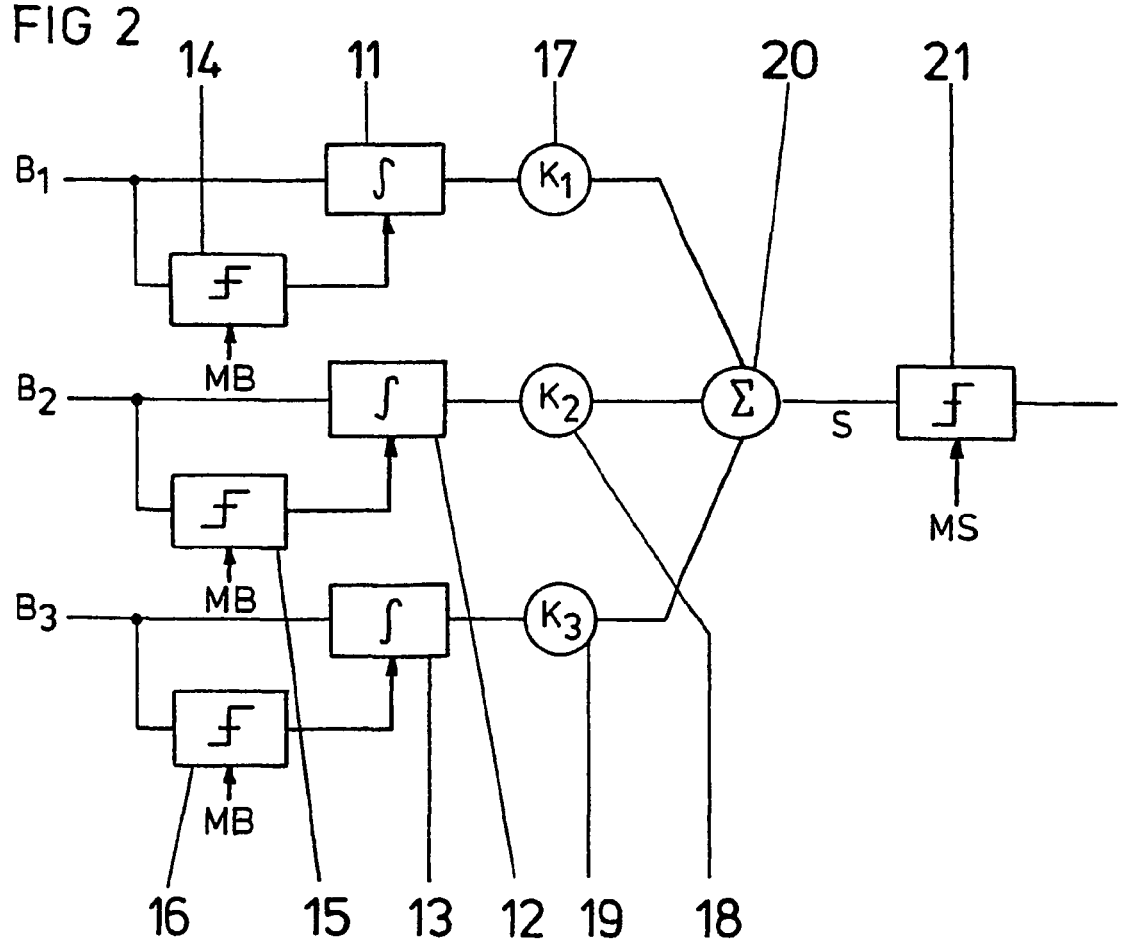
FIG. 2 is a block diagram that shows part of the control device in the case of an occupant restraint system according to the invention.

FIG. 2 shows an embodiment of an arrangement for further processing the acceleration signals $B_1$, $B_2$ and $B_3$ in the control device 4. The arrangement shown may be realized exclusively by hardware, exclusively by software or partly by hardware and partly by software. If the arrangement shown is realized at least partly by software, it can be implemented in the central microcontroller or in a separate microcontroller. If a separate microcontroller is used, it can communicate with the central microcontroller. In this way, reciprocal checking of the acceleration signals is possible.

The signals $B_1$, $B_2$ and $B_3$ are respectively fed to an integrator 11, 12, 13, which is respectively controlled by a comparator 14, 15 or 16 to which one of the acceleration signals $B_1$, $B_2$ and $B_3$ is applied. The comparators 14, 15 and 16 activate the associated integrators 11, 12 and 13 whenever the respective acceleration signals $B_1$, $B_2$ and $B_3$ exceed a value corresponding to a minimum acceleration MB. Downstream of the integrators 11, 12 and 13 are weighting elements 17, 18 and 19, to perform the desired weighting of the individual integrated acceleration signals $B_1$, $B_2$ and $B_3$. The weighted integrated acceleration signals $B_1$, $B_2$ and $B_3$ are then summated by means of a summator 20, the output signal (sum signal S) of which is subsequently compared with the minimum sum MS by means of a comparator 21. At the output of the comparator 21 there is then a signal which can be used instead of a mechanical safing sensor.

Figure 3A:
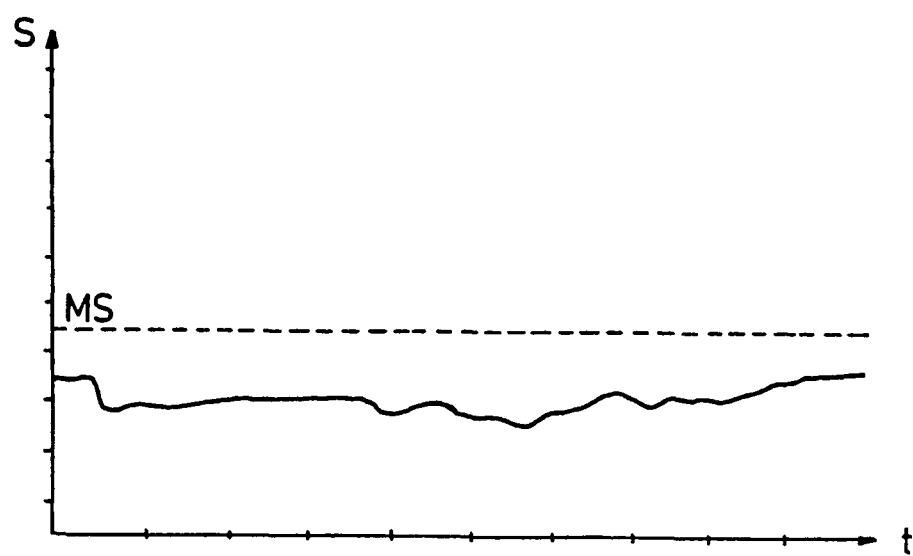
FIGS. 3a and 3b are graphs that show the profile of the safing function for two different operating conditions.
Figure 3B:
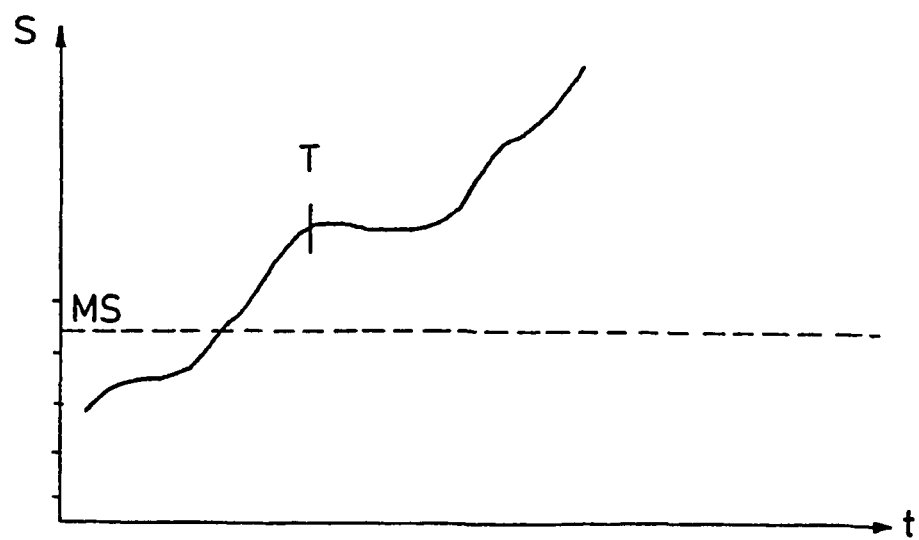

In FIGS. 3a and 3b, the profile of individual functions is represented as an integral of the acceleration over time t for two special operating cases, with a minimum sum MS being defined. The curve of FIG. 3a in this case reproduces the situation when driving in poor road conditions or off-road, while the curve in FIG. 3b shows the collision of the vehicle with an obstacle. In the case of the poor road conditions (FIG. 3a), the integral always remains the minimum sum MS and has no pronounced peaks. In the case of the collision, the minimum sum MS is exceeded by the sum S at a specific point in time.

In the case of an occupant restraint system according to the invention, one or more remotely located electronic acceleration sensors (electronic crash sensors) are consequently used. Two or more of the acceleration sensors may in this case undertake the function of the previous mechanical acceleration sensor (safing sensor), not only providing a replacement for the previous mechanical acceleration sensor but also significantly improving the system function, in particular with regard to the reaction time. As a result of the spatial separation of at least two electronic acceleration sensors, electrical disturbances generally affect only one of the two acceleration sensors. By means of appropriate logical interlinking of minimum thresholds (minimum sum, minimum acceleration for integration), which have to be exceeded by at least two acceleration sensors simultaneously or one after the other with a short delay, airbag triggering of the driver airbag and/or passenger airbag only takes place in the event of a frontal collision, an angled collision, an offset crash, etc.

The functionality of the electronic safing function, taking into account various sensor positions (for example the central control device in the vehicle interior and at least one remotely located acceleration sensor in the front region of the vehicle), can on the one hand be integrated in the microcontroller of the central control device. Another suitable option would be integration into an additional redundant microcontroller or a customer-specific integrated circuit (ASIC), which has to enable triggering by activating the corresponding inputs (the secondary inputs) of the firing circuits, further advantages. In this way, erratic behavior of the central control device cannot ever lead to unwanted triggering of a restraining means.

If the remotely located acceleration sensors have a microcontroller of their own, the calculations required for the plausibility check can already be carried out there and the status of the safing function transferred with the aid of a corresponding communication interface to the central control unit. The evaluation of the protocol in the central control device may be performed independently of the microcontroller, for example in a customer-specific integrated circuit (ASIC), whereby the firing path to the airbag that is redundant with respect to the microcontroller of the central control device is retained.

Accordingly, an occupant restraint system according to the invention has a considerable cost advantage, since it is possible to dispense with the mechanical acceleration sensors and replace them with, for example, less costly integrated circuits.

By contrast with the mechanical acceleration sensors, realizing the safing functionality in this form allows it to be tested fully and in an automated manner at any point in time. Mechanical sensors, on the other hand, cannot be checked for their functional capability without external effects on the central control device.

In addition, the space requirement in the case of an occupant restraint system according to the invention is much less, since it dispenses with the relatively large mechanical acceleration sensors. What is more, the movement of the free mass of the mechanical acceleration sensors and their hard impact against the stops can influence and falsify the signal of the electronic acceleration sensor. This problem, which frequently occurred in the past, can be avoided from the outset in the case of the occupant restraint systems according to the invention by dispensing with the mechanical acceleration sensor.

What is claimed is:

1. An occupant restraint system for restraining occupants of a motor vehicle during a collision, said system comprising:
    restraining means for protecting occupants in the motor vehicle;
    at least two electronic acceleration sensors for detecting a collision, each of said at least two electronic acceleration sensors being arranged as a spatially separate unit from the others of said at least two electronic acceleration sensors and outputting an acceleration signal;
    an evaluation unit connected to said at least two electronic sensors for receiving one of said acceleration signals and signals derived from said acceleration signals and integrating the received signals over time; and
    a control device coupled to at least one of said evaluation unit and said at least two electronic acceleration sensors and including means for weighting the integrated received signals, said control device further comprising means for determining a sum of the weighted integrated signals and means for triggering said restraining means when a sum of said weighted integrated received signals exceeds a minimum sum or when one of each integrated received signal or a signal derived from each integrated received signal exceeds a minimum threshold.

2. The system of claim 1, wherein said evaluation unit is integrated in said control device.

3. The system of claim 2, wherein said control device is directly connected to said at least two electronic acceleration sensors and said control device comprises means for directly evaluating said acceleration signals.

4. The system of claim 1, wherein said evaluation unit includes means for integrating the received signals only when the received signal exceeds a minimum acceleration.

5. The system of claim 1, wherein one of said at least two electronic acceleration sensors is integrated in said control device.

6. The system of claim 5, wherein another one of said at least two electronic acceleration sensors is remote from said control device.

7. The system of claim 6, wherein said another one of said at least two electronic acceleration sensors includes means for signal preprocessing.

8. The system of claim 1, wherein one of said at least two electronic acceleration sensors is remote from said control device.

9. The system of claim 8, wherein said one of said at least two electronic acceleration sensors includes means for signal preprocessing.

10. The system of claim 1, wherein said control device comprises means for performing a plausibility check of said acceleration signals.

11. The system of claim 1, wherein said control device is directly connected to said at least two electronic acceleration sensors and said control device comprises means for directly evaluating said acceleration signals.

* * * * *